(12) United States Patent
Hong et al.

(10) Patent No.: US 9,916,384 B2
(45) Date of Patent: *Mar. 13, 2018

(54) RELATED ENTITIES

(71) Applicant: Google Inc., Mountain View, CA (US)

(72) Inventors: Peter Jin Hong, San Francisco, CA (US); Pravir K. Gupta, Los Altos, CA (US); Nathaniel J. Gaylinn, Mountain View, CA (US); Ramakrishnan Kazhiyur-Mannar, Milpitas, CA (US); Kavi J. Goel, San Francisco, CA (US); Omer Bar-or, Mountain View, CA (US); Jack W. Menzel, Mountain View, CA (US); Christina R. Dhanaraj, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/241,008

(22) Filed: Aug. 18, 2016

(65) Prior Publication Data
US 2016/0357868 A1 Dec. 8, 2016

Related U.S. Application Data

(63) Continuation of application No. 13/775,005, filed on Feb. 22, 2013, now Pat. No. 9,424,353.
(Continued)

(51) Int. Cl.
*G06F 17/30* (2006.01)
(52) U.S. Cl.
CPC .. *G06F 17/30864* (2013.01); *G06F 17/30321* (2013.01); *G06F 17/30604* (2013.01)

(58) Field of Classification Search
CPC ......... G06F 17/30864; G06F 17/30821; G06F 17/30604; G06F 17/30321
(Continued)

(56) References Cited

U.S. PATENT DOCUMENTS

| 6,012,053 A | 1/2000 | Pant et al. |
| 6,169,986 B1 | 1/2001 | Bowman et al. |

(Continued)

FOREIGN PATENT DOCUMENTS

| WO | WO 01/46870 | 6/2001 |
| WO | WO 2005/013149 | 2/2005 |

OTHER PUBLICATIONS

Authorized officer Angélique Vivien, International Search Report and Written Opinion in PCT/US2013/027474, dated Jun. 26, 2013, 17 pages.

*Primary Examiner* — James Trujillo
*Assistant Examiner* — Jessica N Le
(74) *Attorney, Agent, or Firm* — Fish & Richardson P.C.

(57) ABSTRACT

Methods, systems, and apparatus, including computer programs encoded on computer storage media, for receiving a first search query from a user device; receiving search results for the first search query provided by a search engine, wherein each of the search results identifies a respective resource; determining from the search results that the first search query relates to a first entity of a first entity type; determining that one or more entities of a second entity type have a predetermined relationship with the first entity; and transmitting information identifying the one or more entities of the second type to the user device as part of a response to the first search query.

20 Claims, 5 Drawing Sheets

Related U.S. Application Data

(60) Provisional application No. 61/601,975, filed on Feb. 22, 2012.

(58) Field of Classification Search
USPC .................................................. 707/705–706
See application file for complete search history.

(56) References Cited

U.S. PATENT DOCUMENTS

| | | |
|---|---|---|
| 6,785,671 B1 | 8/2004 | Bailey et al. |
| 7,401,072 B2 | 7/2008 | Piscitello et al. |
| 7,836,391 B2 | 11/2010 | Tong |
| 7,970,766 B1 | 6/2011 | Shamsi et al. |
| 8,392,429 B1 | 3/2013 | Clancy et al. |
| 8,577,897 B2 | 11/2013 | Gray |
| 8,645,393 B1 | 2/2014 | Kolak et al. |
| 2003/0055816 A1 | 3/2003 | Paine |
| 2004/0255237 A1 | 12/2004 | Tong |
| 2005/0060311 A1 | 3/2005 | Tong et al. |
| 2005/0114324 A1* | 5/2005 | Mayer ............... G06F 17/30991 |
| 2006/0031214 A1 | 2/2006 | Solaro et al. |
| 2007/0078884 A1 | 4/2007 | Ott, IV et al. |
| 2008/0065621 A1 | 3/2008 | Ellis |
| 2008/0189169 A1 | 8/2008 | Turpin et al. |
| 2008/0306908 A1 | 12/2008 | Agrawal et al. |
| 2009/0144609 A1 | 6/2009 | Liang et al. |
| 2009/0313237 A1* | 12/2009 | Agrawal ............. G06F 17/3064 |
| 2010/0198837 A1 | 8/2010 | Wu et al. |
| 2011/0225155 A1 | 9/2011 | Roulland et al. |
| 2011/0231347 A1 | 9/2011 | Xu et al. |
| 2011/0307432 A1 | 12/2011 | Yao et al. |
| 2011/0320437 A1 | 12/2011 | Kim et al. |
| 2012/0059838 A1 | 3/2012 | Berntson |
| 2012/0101982 A1 | 4/2012 | Gray et al. |
| 2012/0130978 A1 | 5/2012 | Li et al. |
| 2013/0110830 A1 | 5/2013 | Vadlamani |
| 2013/0173604 A1 | 7/2013 | Li et al. |
| 2013/0173639 A1* | 7/2013 | Chandra ........... G06F 17/30864 |
| | | 707/754 |
| 2013/0212081 A1 | 8/2013 | Shenoy et al. |
| 2013/0218861 A1 | 8/2013 | Hong et al. |
| 2013/0238594 A1 | 9/2013 | Hong et al. |
| 2014/0046921 A1 | 2/2014 | Bau |
| 2015/0142767 A1 | 5/2015 | Wu et al. |
| 2016/0179958 A1 | 6/2016 | Hong et al. |

* cited by examiner

RELATED ENTITIES

CROSS-REFERENCE TO RELATED APPLICATIONS

This is a continuation of U.S. application Ser. No. 13/775,005, filed on Feb. 22, 2013, which claims priority to U.S. Provisional Application No. 61/601,975, filed on Feb. 22, 2012. The disclosures of the prior applications are considered part of and are incorporated by reference in the disclosure of this application.

BACKGROUND

This specification relates to Internet search systems.

Internet search engines aim to identify Internet resources (e.g., web pages, images, text documents, multimedia content) that are relevant to a user's needs and to present information about the resources in a manner that is most useful to the user. Internet search engines return a set of search results in response to a user submitted query. Internet search engines generally include one or more services that can classify particular received queries. Such services may include services that classify queries as one or more of: a query that is pornographic, i.e., is seeking pornographic results or for which a large number of search results identifying resources that have been classified as pornographic are returned; a query that is navigational to a particular resource, i.e., is seeking that particular resource; a query that is a local query, i.e., is seeking information about a business located near the user; or a query that is seeking a particular item of information, e.g., is looking for an item of information that is an answer to a question posed in the query.

SUMMARY

This specification describes technologies relating to identifying entities that are related to an entity to which a search query is directed.

In general, one innovative aspect of the subject matter described in this specification can be embodied in methods that include the actions of receiving a first search query from a user device; receiving search results for the first search query provided by a search engine, wherein each of the search results identifies a respective resource; determining from the search results that the first search query relates to a first entity of a first entity type; determining that one or more entities of a second entity type have a predetermined relationship with the first entity; and transmitting information identifying the one or more entities of the second type to the user device as part of a response to the first search query.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. The first entity type can be the same as the second entity type. Determining that one or more entities of the second entity type have a predetermined relationship with the first entity can include: accessing an index that maps each of a plurality of entities to one or more related entities and identifies a relationship between the entity and one or more related entities.

The method can further include: obtaining data identifying the first entity and the first entity type; obtaining data identifying the one or more entities of the second entity type and the relationship between the first entity and the one or more entities of the second entity type; and generating a mapping between the first entity and the one or more entities of the second entity type in the index.

The method can further include: ordering the one or more entities of the second entity type based at least in part on data that identifies, for each of the one or more entities of the second entity type, how frequently the entity is searched for by users after submitting a query directed to the first entity.

The method can further include: ordering the one or more entities of the second entity type based at least in part on how frequently a name of or a recognized reference to each of the one or more entities of the second entity type co-occurs with a name of or a recognized reference to the first entity in resources indexed by an indexing engine. The additional information can include metadata associated with the one or more entities of the second type in the index.

Determining from the search results that the first search query relates to the first entity of the first entity type can include: determining, using an index that maps each of a plurality of resources to a specific entity of a specific type, that a count of search results that identify a resource that is mapped to the first entity exceeds a threshold number.

The method can further include: obtaining data identifying the first entity and the first entity type; obtaining data identifying one or more resources that are associated with the first entity; and generating a respective mapping between the first entity and each of the one or more resources associated with the first entity in the index.

Determining from the search results that the first search query relates to the first entity of the first entity type can include: determining that a number of search results identifying a resource containing a reference to the first entity exceeds a threshold number.

The information identifying the one or more entities can include information identifying a name of each of the one or more entities and the second type. The information identifying the one or more entities can include a respective image corresponding to each of the one or more entities. For each of the one or more entities, the respective image corresponding to the entity can be obtained from an image search engine in response to a search query derived from the name of the entity.

The method can further include: determining that a number of search results identifying a resource to which the second entity type is relevant exceeds a threshold number.

The method can further include: obtaining data that classifies the search query as not being any of a query that is pornographic, a query that is navigational to a particular resource, a local query, or a query that is seeking a particular item of information.

The subject matter described in this specification can be implemented in particular embodiments so as to realize one or more of the following advantages. Users can easily view information about entities that have a particular relationship with an entity to which their search query is directed. In particular, users can easily obtain information identifying entities that are related to an entity of interest by submitting a search query that identifies the entity of interest to a search engine. Additionally, a user can easily submit another search query to obtain more information about the related entities. A user can learn about an entity to which their search query is directed by viewing information about the entities that are related to the entity. For example, a user can learn that a particular person is an author by submitting a query that includes the name of the particular person to a search engine and being presented with information identifying books written by the particular person. Additionally, questions that users will likely have about an entity after submitting a query directed to the entity can be predicted and information about entities that are answers to those questions can be provided to the user as part of a response to the query, e.g., without the user having to submit another search query or navigate to another resource to seek out the answers. For example, users submitting queries directed to an author may frequently subsequently look for information about particular books written by the author. Information identifying those particular books can be presented to the user as part of a response to the search query without the user having to submit additional queries or navigate to resources identified by the search results for the query.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
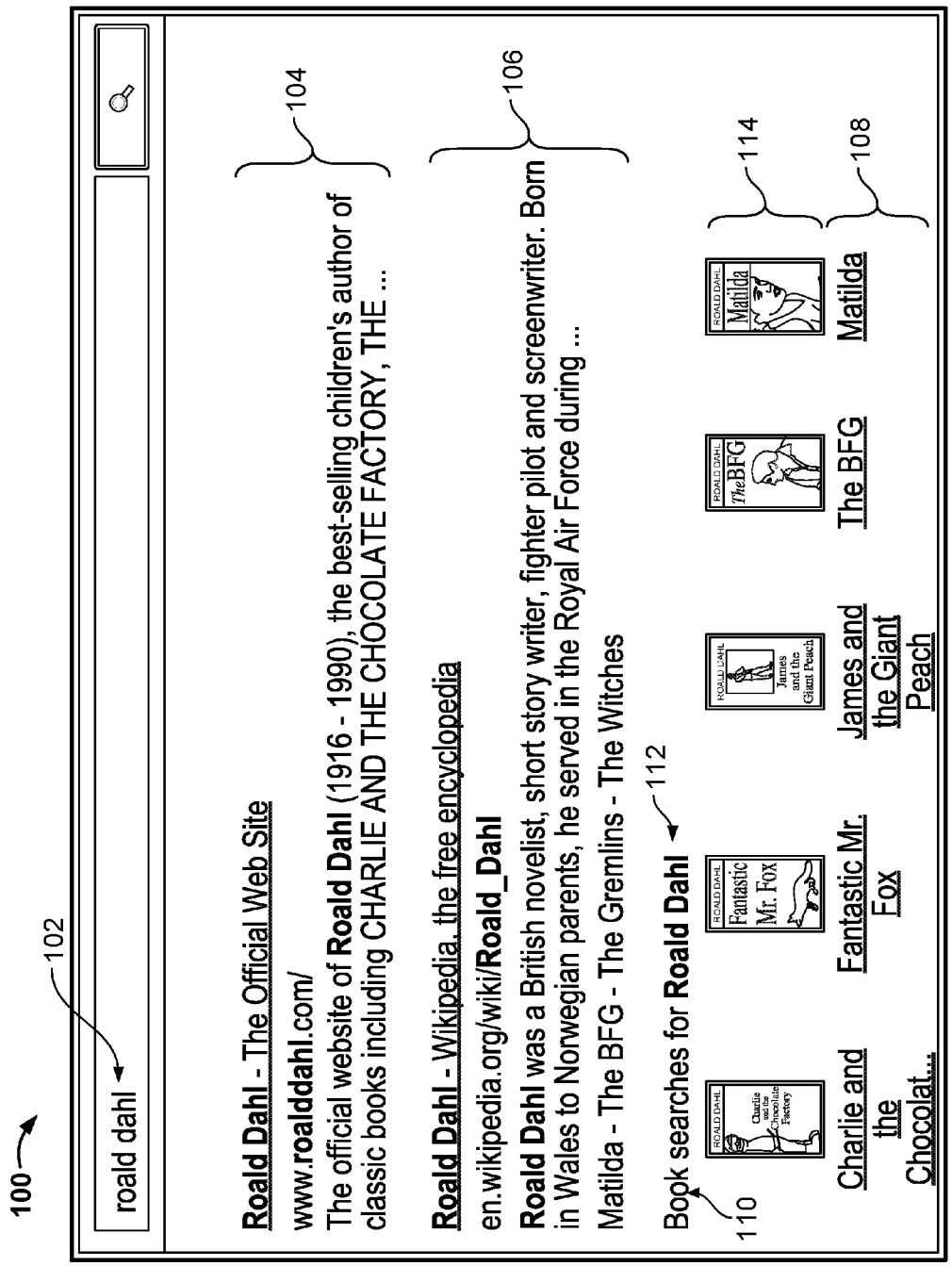
FIG. 1 shows an example search results page.

FIG. 1 shows an example search results page 100 for a search query 102 "roald dahl." The search results page 100 includes two search results 104 and 106 and names of related entities 108. The search results 104 and 106 and the names of related entities 108 are generated by a search system in response to the search query 102. The search system identifies the search results 104 and 106, for example, using conventional search techniques. The search system classifies the search query 102 as being directed to a particular entity, i.e., the author Roald Dahl, and returns names of related entities 108 that have a predetermined relationship with the particular entity, i.e., that are books authored by Roald Dahl, for presentation in the search results page 100. In the illustrated example, one of the criteria met by the search query 102 may be that one or both of the search results 104 and 106 generated by the search system in response to the search query 102 identify a resource that has been determined to be an authoritative resource for the author Roald Dahl. For example, one or both of the resources identified by the search results 104 and 106, i.e., the official web site of the author Roald Dahl and the Wikipedia page for the author Roald Dahl, may have been determined to be an authoritative resource for the author Roald Dahl. In response to the search query 102, the search system selects the names of the related entities that are to be returned, e.g., using an index that stores data identifying entities that have a relationship with the author Roald Dahl.

Each name in the names of related entities 108, e.g., "Charlie and the Chocolate Factory" and "James and the Giant Peach," is presented in the form of a link by which a user can obtain search results for a query derived from the name of the related entity. For example, the query derived from the name of the related entity can include one or more of the name of the related entity, e.g., "Charlie and the Chocolate Factory," the text of the search query 102, e.g., "Roald Dahl," and the name of the entity type to which the name belongs, e.g., "book." Each name is presented with an image 114 that corresponds to the name, e.g., an image of the front cover of the book. Each of the images may also be presented in the form of a link by which a user can get search results for the query derived from the name of the related entity to which the image corresponds. In some implementations, in response to a user hovering a cursor of an input device over one of the images 114, additional information about the related entity to which the image corresponds is displayed. For example, in response to a user hovering over one of the images 114, the year that the book to which that image corresponds could be displayed to the user.

The search results page also includes information 110 identifying the type of the related entities, in this case "books," named in the search results page 100 and information 112 identifying the entity to which the search query 102 was determined to relate, in this case, "Roald Dahl."

Figure 2:
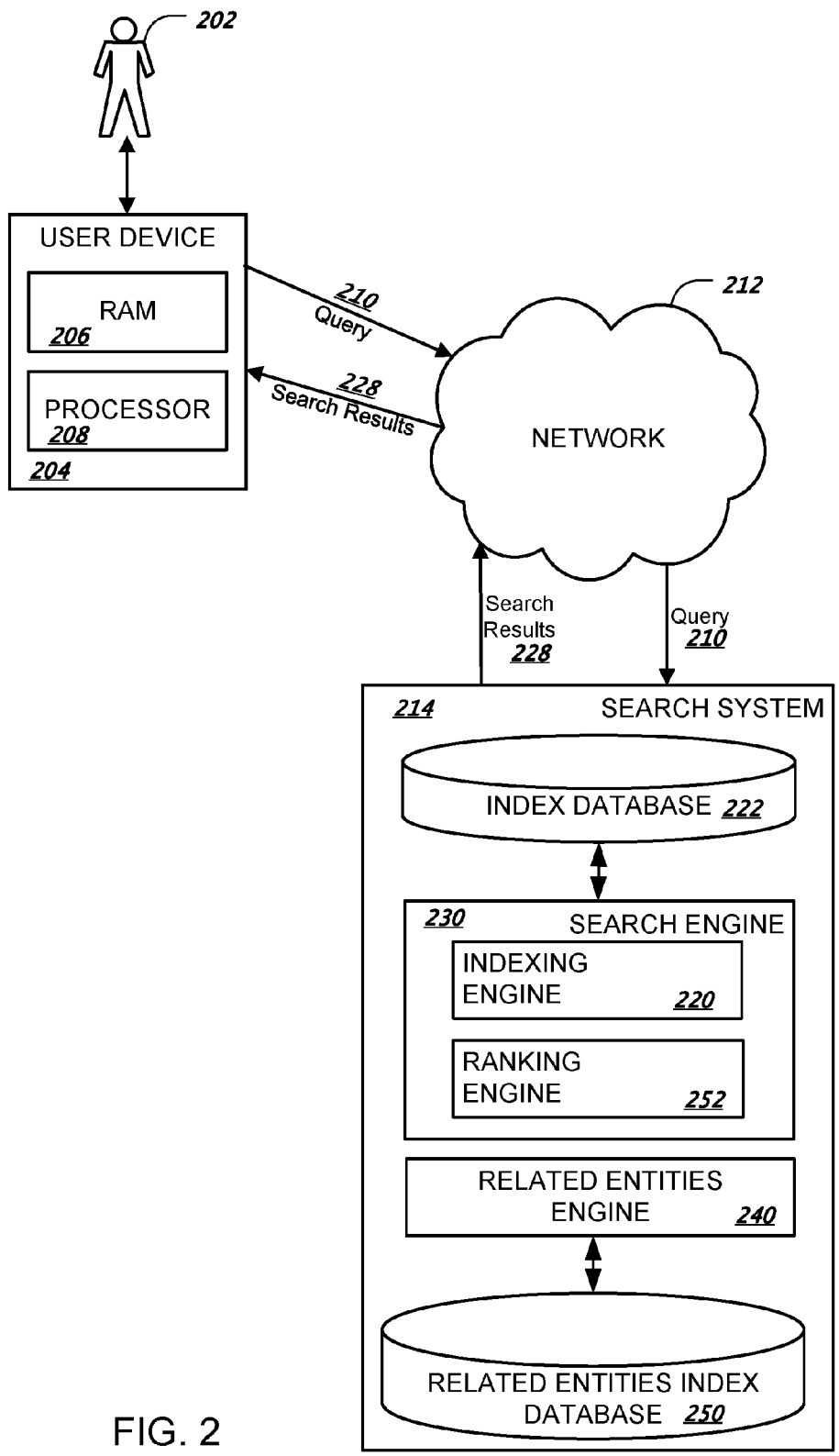
FIG. 2 is a block diagram of an example search system.

FIG. 2 is a block diagram of an example search system 214. The search system 214 is an example of an information retrieval system implemented as computer programs on one or more computers in one or more locations, in which the systems, components, and techniques described below can be implemented.

A user 202 can interact with the search system 214 through a user device 204. For example, the user device 204 can be a computer coupled to the search system 214 through a data communication network 212, e.g., local area network (LAN) or wide area network (WAN), e.g., the Internet, or a combination of networks. In some cases, the search system 214 can be implemented on the user device 204, for example, if a user installs an application that performs searches on the user device 204. The user device 204 will generally include a memory, e.g., a random access memory (RAM) 206, for storing instructions and data and a processor 208 for executing stored instructions. The memory can include both read only and writable memory.

A user 202 can use the user device 204 to submit a query 210 to a search system 214. A search engine 230 within the search system 214 performs a search to identify resources matching the query. When the user 202 submits a query 210, the query 210 may be transmitted through the network 212 to the search system 214. The search system 214 includes an index database 222 and the search engine 230. The search system 214 responds to the query 210 by generating search results 228, which are transmitted through the network to the user device 204 for presentation to the user 202, e.g., as a search results web page to be displayed by a web browser running on the user device 204.

In this specification, the term "database" will be used broadly to refer to any collection of data: the data does not need to be structured in any particular way, or structured at all, and it can be stored on storage devices in one or more locations. Thus, for example, the index database 222 can include multiple collections of data, each of which may be organized and accessed differently. Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

When the query 210 is received by the search engine 230, the search engine 230 identifies resources that satisfy the query 210. The search engine 230 will generally include an indexing engine 220 that indexes resources, an index database 222 that stores the index information, and a ranking engine 252 or other software that generates scores for the resources that satisfy the query 210 and that ranks the resources according to their respective scores.

The search system 214 also includes or can communicate with a related entities engine 240 that determines, from the search results 228, whether the query 210 is directed to a particular entity, i.e., whether the query should be classified as being directed to the particular entity. Determining whether a query is directed to a particular entity will be described in more detail below with reference to FIG. 4. If the query is directed to a particular entity, the related entities engine 240 identifies entities that have a predetermined relationship to the particular entity. Identifying entities that have a predetermined relationship to the particular entity will be described in more detail below with reference to FIG. 3. Once the related entities are identified, the search system 214 can transmit information identifying the related entities to the user device 204 as part of a response to the search query 210, e.g., with the search results 228 or in place of the search results 228.

In order to determine whether the query is directed to a particular entity and to identify the entities that are related to the particular entity, the related entities engine 240 can communicate with a related entities index database 250. The related entities index database 250 includes two indices, one that maps each entity of a group of entities to one or more related entities and identifies a relationship between the entity and the one or more related entities, and another that maps, to each entity of the group of entities, one or more authoritative resources for the entity. Building these indices is described below with reference to FIG. 5.

Figure 3:
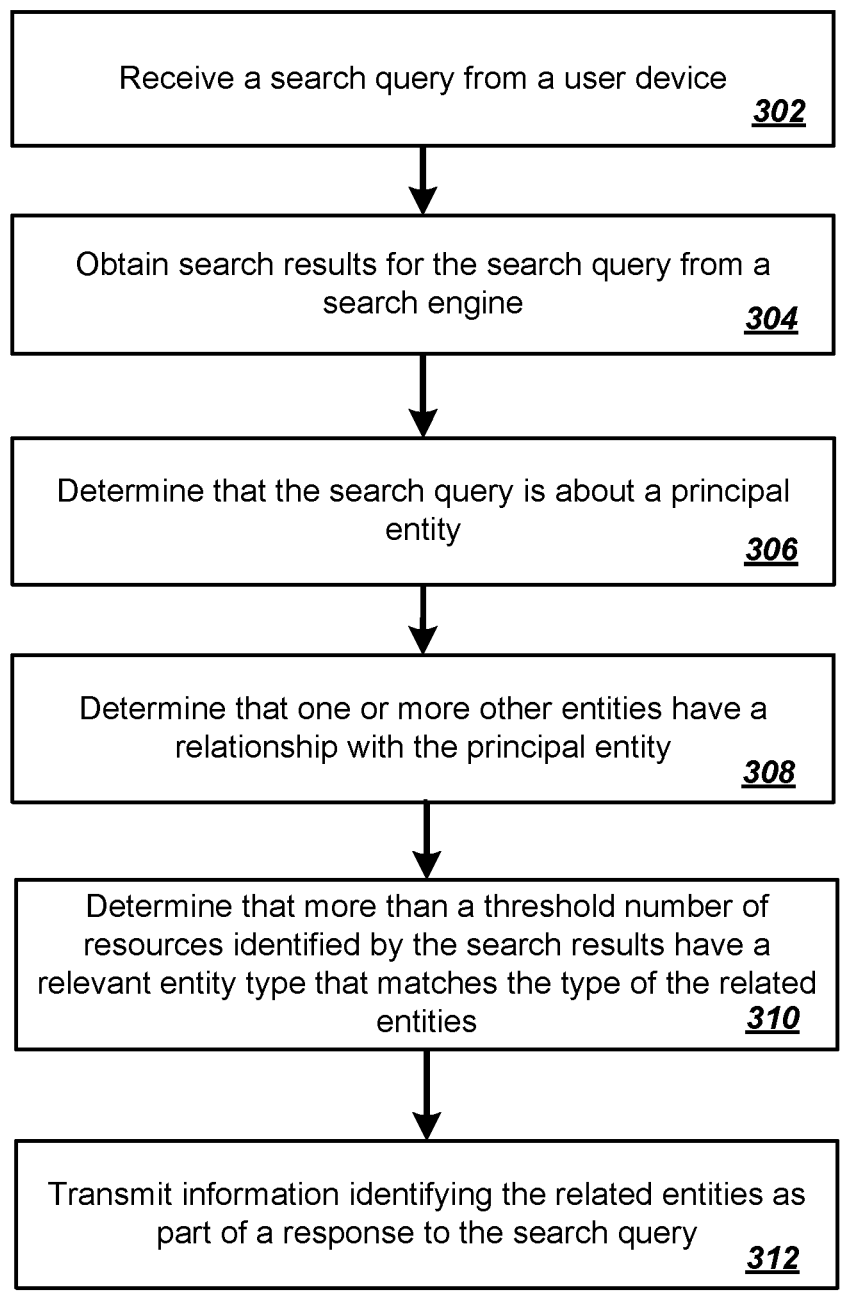
FIG. 3 is a flow diagram of an example process for identifying one or more related entities to be identified as part of a response to a search query.

FIG. 3 is a flow diagram of an example process 300 for identifying one or more related entities to be identified as part of a response to a search query. For convenience, the process 300 will be described as being performed by a system of one or more computers located in one or more locations. For example, a search system, e.g., search system 214 of FIG. 2 can be used to perform the process 300.

The system receives a search query from a user device (step 302) and obtains search results for the search query from a search engine (step 304). The system also obtains data that, for at least some of the resources identified by the search results, identifies one or more entity types that are relevant to the resource. For example, the data may identify the entity types "car" and "movie" as being relevant to one resource identified by one search result, the entity types "actor" and "author" as being relevant to another resource identified by another search result, and so on.

The system determines that the search query is about a principal entity (step 306). The system does so by analyzing the search results obtained for the search query. Determining that a search query is directed to an entity from an analysis of search results for the search query is described in more detail below with reference to FIG. 4.

In some implementations, the system has access to information that characterizes the search query as either belonging or not belonging to one or more special classes. The system can obtain the information from, e.g., one or more services included in the search engine from which the search results are obtained. For example, the system can obtain data that characterizes the search query as potentially being one or more of pornographic, navigational, or local, or that characterizes the search query as a query that is seeking a particular item of information. In such implementations, even if the search results for the search query indicate that the search query is directed to a particular entity, the system can refrain from returning information about related entities as part of a response to the search query if the information indicates that the search query belongs to one or more of the special classes, e.g., because returning names of related entities may be inappropriate or undesirable to the user.

The system determines that one or more other entities have a relationship with the principal entity (step 308). The system determines that the one or more other entities have a relationship with the principal entity by accessing an index, e.g., an index in the related entities index database 250 of FIG. 2, that maps entities to other entities that have a pre-determined relationship with the entity. The index also identifies the type of the one or more related entities and, optionally, the relationship between the entity to which the search query is directed and the related entities. The related entities can be of the same type as the entity or of a different type, depending on the pre-determined relationship. For example, for a particular movie, the related entities may be actors who starred in the movie, the producer of the movie, the director of the movie, and so on. Alternatively, the related entities may be other movies that were produced by the same producer, that were directed by the same director, or that share one or more actors with the movie. The index can also identify the type of the related entities, e.g., "actor," and the relationship between the related entities and the principal entity, e.g., "acted in."

The system determines that more than a threshold number or a threshold proportion of resources identified by the search results have a relevant entity type that matches the type of the related entities (step 310) using the data about relevant entity types obtained from the search engine. In determining which resources have relevant entity types that match the type of the related entities, the system may consider only resources identified by, e.g., a specified number of highest-ranked search results or search results having a score assigned to them by the search engine that exceeds a threshold value. For example, for a search query determined to be directed to entity of the type "author," the system may determine that one or more entities of the type "book" have a relationship to the author. The system can then check whether a sufficient number of resources identified by the search results have a relevant entity type of "book" before determining to return names of the books that relate to the author as part of a response to the search query.

The system transmits information identifying the related entities as part of a response to the search query (312). The information identifying the related entities can be, e.g., included in a search results web page and transmitted to the user device for presentation to a user. The information identifying the related entities can include the name of each entity presented to the user in the form of a respective link that, when selected by a user, submits a search query derived from the name of the entity to a search engine, e.g., the search engine 230 of FIG. 2. The search query derived from the name of the entity can include only the name of the related entity or the name and, e.g., one or more of the type of the related entity and the name of the principal entity, depending on whether the query consisting of only the name of the entity is determined to be ambiguous.

A search query can be determined to be ambiguous if the search results for the search query indicate that the search query is not directed to any one particular entity. That is, if, after an analysis of the search results for the search query, it is determined that the search query is not directed to any entity or is directed to more than one entity, the search query is determined to be ambiguous. Determining that a search query is directed to an entity from an analysis of search results for the search query is described in more detail below with reference to FIG. 4. If the search results are ambiguous, the link, when selected by the user, submits a query that includes the name of the entity and one or more of the type of the related entity and the name of the principal entity.

The information identifying the related entities can optionally include, instead of or in addition to the names of the related entities, an image that corresponds to the related entity. Like the names of the entities, each image can be presented in the form of a link, that when selected by a user, submits a search query derived from the name of the entity to which the image corresponds to the search engine. The system can obtain the corresponding image for a related entity by submitting a search query derived from the name of the entity to an image search engine and selecting an image from the images identified by image search results for the search query, e.g., by selecting the image identified by a highest-ranked image search result. The query derived from the name of the entity can be a query that has been determined to not be ambiguous, e.g., using the technique described above. Alternatively, the system can maintain an index that provides images for entities. The information identifying the related entities can also optionally include metadata that is associated with the related entities in the index. For example, for an entity of the type "book," the metadata can identify the year the book was originally published.

Figure 4:
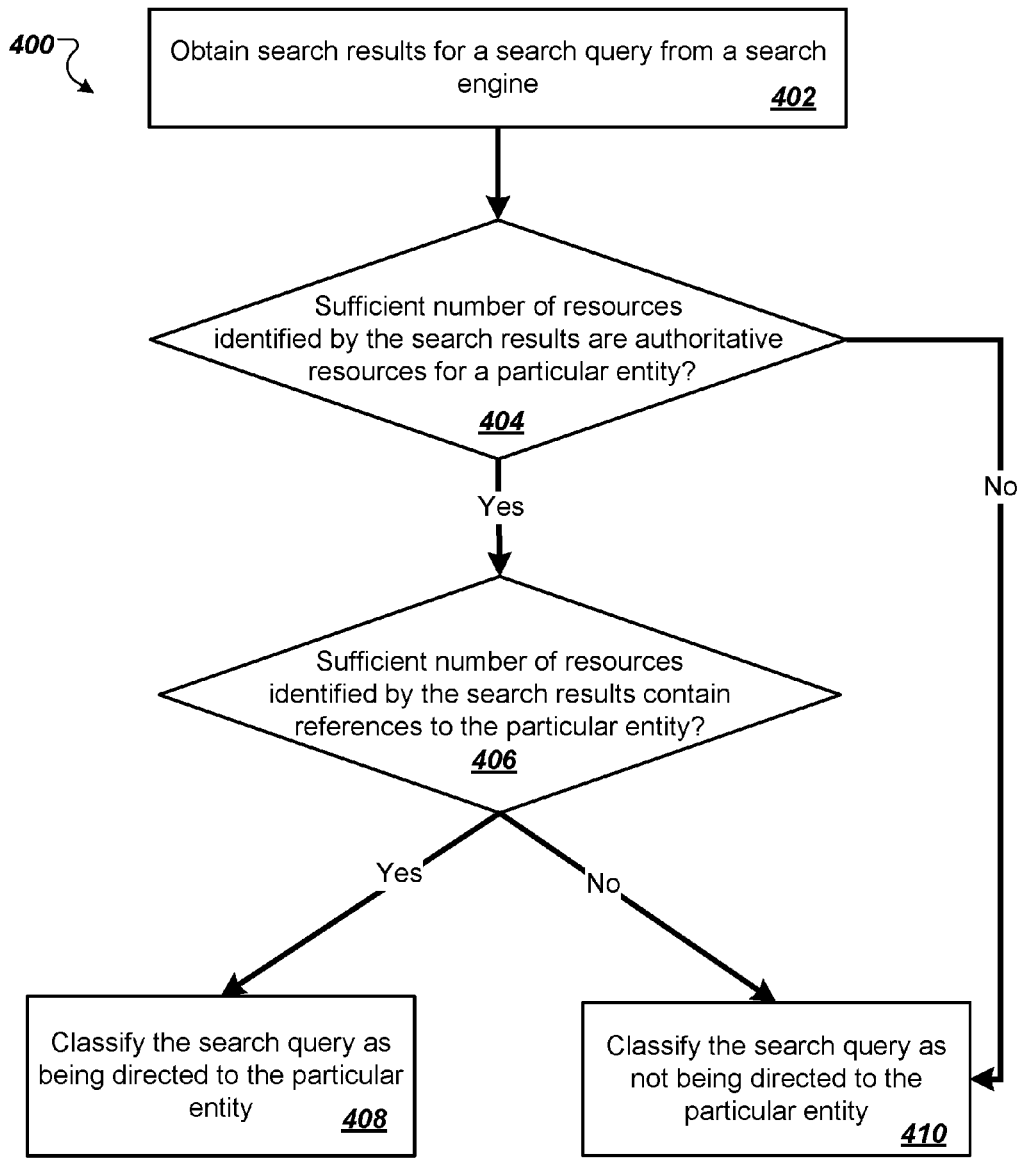
FIG. 4 is a flow diagram of an example process for determining that a search query is directed to a particular entity.

FIG. 4 is a flow diagram of an example process 400 for determining that a search query is directed to a particular entity. For convenience, the process 400 will be described as being performed by a system of one or more computers located in one or more locations. For example, a search system, e.g., search system 214 of FIG. 2, can be used to perform the process 400.

The system obtains search results for a search query from a search engine (step 402).

The system determines whether a sufficient number of resources identified by the search results are authoritative resources for a particular entity (step 404). For example, the system may determine whether the number or proportion of resources that are authoritative resources for the particular entity exceeds a threshold value. In determining which resources are authoritative resources, the system may consider resources identified by, e.g., a specified number of highest-ranked search results or search results having a score assigned to them by the search engine that exceeds a threshold value.

The system determines whether a resource identified by a search result is an authoritative resource for any entities by accessing an index, e.g., an index included in the related entities database 250 of FIG. 2, that maps authoritative resources to entities. An authoritative resource for an entity is a resource whose occurrence in search results has been determined to be a strong indicator that the search query is directed to the entity. Determining which entities are authoritative and building the index is described below with reference to FIG. 5.

If an insufficient number of resources are authoritative resources for the particular entity, the system classifies the search query as not being directed to the particular entity (step 410).

If the number of resources that are authoritative resources for the particular entity is sufficient, the system determines whether more than a threshold number or a threshold proportion of resources identified by the search results contain references to the particular entity (step 406). For example, the system can determine whether the number of resources having more than a specified number of occurrences of any form of the name of the particular entity exceeds the threshold number.

If the number of resources containing references to the particular entity is sufficient, the system classifies the search query as being directed to the particular entity (step 408). If the number of resources is not sufficient, the system classifies the search query as not being directed to the particular entity (step 410).

Figure 5:
FIG. 5 is a flow diagram of an example process for building indices to be used in selecting relevant entities.

FIG. 5 is a flow diagram of an example process 500 for building indices to be used in selecting relevant entities. For convenience, the process 500 will be described as being performed by a system of one or more computers located in one or more locations. For example, a search system, e.g., search system 214 of FIG. 2, can be used to perform the process 500.

The process 500 can be performed for multiple entities of multiple types.

The system obtains data identifying a particular entity of a particular type (step 502). The obtained data includes one or more names for the particular entity and identifies the type of the entity. The obtained data can also optionally identify one or more resources associated with the entity. For example, for the author J. R. R. Tolkien, the obtained data can include the name of the entity, "J. R. R Tolkien," and identify the type of the entity, "author." The data can also optionally include the resource locators for one or more resources associated with the author J. R. R. Tolkien, e.g., an online encyclopedia page directed to the author or an official webpage of the author. In some circumstances, the obtained data may identify more than one type for the particular entity. For example, the data could characterize Will Smith as being of the type "actor" and of the type "musician."

The system can obtain data identifying entities from a variety of sources. For example, one source may be an online database of structured data that includes nodes that represent entities and identifies the type of each entity represented by a node. An example of an online database of structured data that exists is the FREEBASE database that is accessible on the Internet at http://www.freebase.com. Other sources can include online encyclopedias having pages directed to each of a group of entities and websites directed to particular types of entities, e.g., a website that includes resources directed to movies and movie-related entities, e.g., actors, directors, and producers.

The system identifies one or more resources as authoritative resources for the particular entity (step 504). If the obtained data identifying the entity also identifies resources associated with the entity, the system can select those resources as authoritative resources for the entity. For example, an online encyclopedia page for an entity may contain links to other resources that relate to the entity, e.g., the official website of the entity. Additionally, resources relating to the entity may be associated with the node representing a particular entity in an online database of structured data, e.g., by way of a link to another node or by way of a link representing a property of the entity.

If the data does not identify any associated resources for an entity, or to augment the resources identified for the entity by the data, the system can submit a search query derived from the name or names of the entity to a search engine and obtain search results for the search query. The system can then select as authoritative resources for the entity particular resources from the resources identified by the obtained search results. For example, the system can select a specified number of highest-scoring search results or each search result having a score that exceeds a threshold score.

The system associates the authoritative resources with the particular entity in an index (step 506). For example, for each authoritative resource for a particular entity, the system can generate a mapping from, i.e., data defining an association between, the resource locator of the resource to the particular entity. The index can be, e.g., one of the indices included in the related entities index database 250.

If the obtained data identifies more than one entity type for the particular entity, the system can select one of the types as the entity type for the entry for the particular entity in the index. For example, the system can obtain search results for a search query that is derived from the name of the particular entity. For each of a pre-determined number of highest-ranked search results, the system can obtain data identifying the relevant entity types for the resource identified by the search result, e.g., from a service that identifies the entity types that are relevant to resources. The system can then select one of the entity types for the particular entity based on the relevant entity types, e.g., select the entity type that is relevant to the most resources as the entity type for the particular entity.

Alternatively, the system can generate an entry in the index for each of the types for that entity, e.g., one entry for Will Smith the "actor" and one for Will Smith the "musician," and associate one or more of the identified authoritative resources with the respective entry for each of the types. The system can select which of the authoritative resources are associated with each of the entries for the particular entity by obtaining data that, for each of the authoritative resources, identifies the relevant entity types for that authoritative resource. For each of the index entries for the particular entity, the system can then associate the authoritative resources having a related entity type that matches the entity type for that entry.

For example, in the case where Will Smith is identified as both an "actor" and a "musician," the system may identify two authoritative resources for Will Smith: a web page directed to Will Smith from a web site about actors and movies and a web page directed to Will Smith from a social media web site for musicians. The system can obtain data identifying the most relevant entity types for each of the authoritative resources and associate the page from the web site about actors and movies with entity "Will Smith" having the type "actor", e.g., because the obtained data indicated that the entity type "actor" is relevant to the page. The system can also associate the page from the social media web site with the entity "Will Smith" having the entity type "musician", e.g., because the obtained data indicated that the entity type "musician" is relevant to the page.

The system obtains data identifying other entities having a relationship with the particular entity (step 508). If the particular entity has more than one type, the system obtains data identifying other entities for each of the types. The desired type of relationship can be predetermined, e.g., specified by a system administrator. That is, the system administrator can specify that, for entities of the type "author," the obtained data should identify entities of the type "book" that were written by the author. The system can obtain the data identifying the other entities and their relationship with the entity from, e.g., the same source from which the data identifying the entity was obtained or from additional sources. For example, the system can query the online database of structured data to obtain data identifying entities that relate to the entity. For example, for an entity representing an actor, the system can query the online database of structured data to obtain data identifying one or more movies in which the actor acted. Additionally, a page in an online encyclopedia directed to the entity may identify other entities that relate to the entity. For example, an online encyclopedia page for a musical artist can identify albums by the musical artist, popular songs of the musical artist, and so on.

The system orders the entities having a predetermined relationship with the particular entity (step 510). In some implementations, the system orders the related entities according to the order in which they were received by the system from a data source. However, in other implementations, the system reorders the related entities, e.g., to account for users submitting search queries that are directed to the particular entity being more interested in information about particular ones of the entities that are related to the particular entity. The system may order the related entities based on a variety of factors.

For example, the system may order the related entities based at least in part on how frequently the name of or a recognized reference to each related entity co-occurs with the name of or a recognized reference to the particular entity in resources indexed by an indexing engine, e.g., indexing engine 220 of FIG. 2, e.g., so that related entities that co-occur more frequently with the particular entity are closer to the beginning of the order than related entities that co-occur less frequently with the particular entity.

As another example, the system may order the related entities based at least in part on how frequently each related entity is searched for by users after submitting a query directed to the particular entity. For example, the system may obtain data that identifies, for each of the related entities, how frequently users submit search queries that include a name of the related entity after submitting an initial search query that includes a name of the particular entity, e.g., within a pre-determined window of time of submitting the initial search query or immediately following submitting the initial search query. A search query can be considered to be submitted immediately following another search query if it is submitted within a pre-determined window of time of submitting the other search query and, when the search query is submitted, no additional search queries have been submitted after the other search query was submitted. The system can then order the related entities based on the obtained frequencies, e.g., so that entities that are searched for more frequently after the initial search query is submitted are closer to the beginning of the order than related entities that are searched for less frequently after the initial search query is submitted.

As another example, the system may order the related entities based at least in part on how frequently any form of the names of each of the related entities appears in a search query submitted by a user that does not also include any form of the name of the particular entity, how frequently a reference to any form of the names of each of the related entities appears in a resource indexed by the indexing engine that does not also include a reference to any form of the name of the particular entity, or both.

The system associates the related entities with the particular entity in an index (step 512). For example, the system can generate a mapping from the particular entity to each of the related entities. The mapping can also identify the type of the related entities and, optionally, the nature of the relationship between the particular entity and the related entities. The index can be, e.g., one of the indices included in the related entities index database 250. The system can generate the mapping in such a manner that, when the related entities are selected for presentation to a user in response to a search query directed to the particular entity, the related entities are presented in an order that matches the order generated by the system.

In some implementations, the system also obtains additional information about each of the related entities from one of the data sources and stores the additional information in an index, e.g., as metadata associated with the related entity, for later display to a user, e.g., as described above with reference to FIG. 1. The data obtained may depend on the type of the related entities and on the relationship between the related entities and the particular entity. For example, if the particular entity is an entity of the type "movie" and the related entities are entities of the type "actor" that acted in the movie, the additional information may include the name of the character played by each of the related entities. However, if the particular entity is an entity of the type "author" and the related entities are entities of the type "book" that are written by the author, the additional information may include the year that each of the related entities was first published. Thus, the additional information may be a value of a property that the related entity possesses by virtue of that entity's relationship with the particular entity.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   maintaining an authoritative resources index that, for each entity of a plurality of entities, maps one or more authoritative resources to the entity, wherein each of the one or more authoritative resources is a resource whose occurrence in search results for a received search query has been determined to be an indicator that the received search query is directed to the entity;
   receiving a first search query from a user device;
   receiving search results for the first search query provided by a search engine, wherein each of the search results identifies a respective resource;
   determining that the first search query relates to a first entity of a first entity type based on determining that a count of search results for the first search query that identify resources that have been mapped to the first entity in the authoritative resources index exceeds a first threshold number; and
   in response to determining that the first search query relates to the first entity of the first entity type, transmitting information identifying one or more entities of a second entity type that have a predetermined relationship with the first entity to the user device as part of a response to the first search query.

2. The method of claim 1, wherein the first entity type is the same as the second entity type.

3. The method of claim 1, further comprising:
   determining that the one or more entities of the second entity type have the predetermined relationship with the first entity to which the first search query relates, comprising determining that a related entity index maps the first entity to the one or more entities of the second entity type.

4. The method of claim 3, further comprising:
   obtaining data identifying the first entity and the first entity type;
   obtaining data identifying the one or more entities of the second entity type and the relationship between the first entity and the one or more entities of the second entity type; and
   generating a mapping between the first entity and the one or more entities of the second entity type in the related entity index.

5. The method of claim 1, further comprising:
   ordering the one or more entities of the second entity type based at least in part on data that identifies, for each of the one or more entities of the second entity type, how frequently the entity is searched for by users after submitting a query directed to the first entity.

6. The method of claim 1, further comprising:
   ordering the one or more entities of the second entity type based at least in part on how frequently a name of or a recognized reference to each of the one or more entities of the second entity type co-occurs with a name of or a recognized reference to the first entity in resources indexed by an indexing engine.

7. The method of claim 1, wherein the information identifying the one or more entities comprises metadata associated with the one or more entities of the second type in the related entity index.

8. The method of claim 1, further comprising:
   obtaining data identifying the first entity and the first entity type;

obtaining data identifying one or more resources that are associated with the first entity; and generating a respective mapping between the first entity and each of the one or more resources associated with the first entity in the second index.

9. The method of claim 1, wherein determining from the search results that the first search query relates to the first entity of the first entity type further comprises:

determining that a number of search results identifying a resource containing a reference to the first entity exceeds a second threshold number; and determining that the first search query relates to the first entity based on (i) determining that the count of search results for the first search query that identify resources that have been mapped to the first entity in the authoritative resources index exceeds the first threshold number and (ii) determining that the number of search results identifying a resource containing a reference to the first entity exceeds the second threshold number.

10. The method of claim 1, wherein the information identifying the one or more entities comprises information identifying a name of each of the one or more entities and the second type.

11. The method of claim 1, wherein the information identifying the one or more entities comprises a respective image corresponding to each of the one or more entities.

12. The method of claim 11, wherein, for each of the one or more entities, the respective image corresponding to the entity is obtained from an image search engine in response to a search query derived from the name of the entity.

13. The method of claim 1, further comprising:

determining that a number of search results identifying a resource to which the second entity type is relevant exceeds a third threshold number; and transmitting the information identifying the one or more entities of the second type in response to determining that the number of search results identifying a resource to which the second entity type is relevant exceeds the third threshold number.

14. The method of claim 1, further comprising:

obtaining data that classifies the search query as not being any of a query that is pornographic, a query that is navigational to a particular resource, a local query, or a query that is seeking a particular item of information; and transmitting the information identifying the one or more entities of the second type in response to obtaining the data that classifies the search query.

15. A system comprising one or more computers and one or more storage devices storing instructions that when executed by the one or more computers cause the one or more computers to perform operations comprising:

maintaining an authoritative resources index that, for each entity of a plurality of entities, maps one or more authoritative resources to the entity, wherein each of the one or more authoritative resources is a resource whose occurrence in search results for a received search query has been determined to be an indicator that the received search query is directed to the entity;

receiving a first search query from a user device;

receiving search results for the first search query provided by a search engine, wherein each of the search results identifies a respective resource;

determining that the first search query relates to a first entity of a first entity type based on determining that a count of search results for the first search query that identify resources that have been mapped to the first entity in the authoritative resources index exceeds a first threshold number; and in response to determining that the first search query relates to the first entity of the first entity type, transmitting information identifying one or more entities of a second entity type that have a predetermined relationship with the first entity to the user device as part of a response to the first search query.

16. The system of claim 15, the operations further comprising:

determining that the one or more entities of the second entity type have the predetermined relationship with the first entity to which the first search query relates, comprising determining that a related entity index maps the first entity to the one or more entities of the second entity type.

17. The system of claim 16, the operations further comprising:

obtaining data identifying the first entity and the first entity type;

obtaining data identifying the one or more entities of the second entity type and the relationship between the first entity and the one or more entities of the second entity type; and generating a mapping between the first entity and the one or more entities of the second entity type in the related entity index.

18. The system of claim 15, the operations further comprising:

obtaining data identifying the first entity and the first entity type;

obtaining data identifying one or more resources that are associated with the first entity; and generating a respective mapping between the first entity and each of the one or more resources associated with the first entity in the second index.

19. The system of claim 15, wherein determining from the search results that the first search query relates to the first entity of the first entity type further comprises:

determining that a number of search results identifying a resource containing a reference to the first entity exceeds a second threshold number; and determining that the first search query relates to the first entity based on (i) determining that the count of search results for the first search query that identify resources that have been mapped to the first entity in the authoritative resources index exceeds the first threshold number and (ii) determining that the number of search results identifying a resource containing a reference to the first entity exceeds the second threshold number.

20. One or more non-transitory storage media storing instructions that when executed by one or more computers cause the one or more computers to perform operations comprising:

maintaining an authoritative resources index that, for each entity of a plurality of entities, maps one or more authoritative resources to the entity, wherein each of the one or more authoritative resources is a resource whose occurrence in search results for a received search query has been determined to be an indicator that the received search query is directed to the entity;

receiving a first search query from a user device;

receiving search results for the first search query provided by a search engine, wherein each of the search results identifies a respective resource;

determining that the first search query relates to a first entity of a first entity type based on determining that a count of search results for the first search query that identify resources that have been mapped to the first entity in the authoritative resources index exceeds a first threshold number; and in response to determining that the first search query relates to the first entity of the first entity type, transmitting information identifying one or more entities of a second entity type that have a predetermined relationship with the first entity to the user device as part of a response to the first search query.

* * * * *